United States Patent [19]
Boyd

[11] Patent Number: 5,816,616
[45] Date of Patent: Oct. 6, 1998

[54] TRAILER FENDER WITH POSITIVELY RESTRAINED STEPS AND METHOD OF MOUNTING

[75] Inventor: Scott A. Boyd, Ripon, Wis.

[73] Assignee: Karavan Trailers, Inc., Fox Lake, Wis.

[21] Appl. No.: 725,748

[22] Filed: Oct. 4, 1996

[51] Int. Cl.⁶ .................................. B60R 3/00; B62R 9/16
[52] U.S. Cl. ....................... 280/847; 280/848; 280/164.1; 280/169
[58] Field of Search ....................... 280/847, 848, 280/849, 770, 155, 854, 160, 163, 164.1, 412, 414.1, 169; 182/90, 127; 296/198

[56] References Cited

U.S. PATENT DOCUMENTS

| | | | |
|---|---|---|---|
| D. 308,953 | 7/1990 | Godbersen | D12/106 |
| D. 314,735 | 2/1991 | Godbersen | D12/106 |
| 2,537,707 | 1/1951 | Russ et al. | 280/163 |
| 2,974,977 | 3/1961 | Herron | 280/847 |
| 3,876,229 | 4/1975 | Kohn et al. | 280/847 |
| 4,986,571 | 1/1991 | Godbersen | 280/770 |
| 5,171,037 | 12/1992 | Thomposon et al. | 280/770 |
| 5,518,261 | 5/1996 | Godbersen | 280/414.1 |

*Primary Examiner*—Brian L. Johnson
*Assistant Examiner*—Bridget Avery
*Attorney, Agent, or Firm*—Donald Cayen

[57] ABSTRACT

A fender having an arcuate section and integral steps is mounted to a trailer frame. The fender arcuate section has a recessed pad. The steps are reinforced with ribs. A pair of fender brackets each having a horizontal center plate are secured to the trailer frame using bolts. The fender step ribs are placed on the fender bracket center plates and fastened thereto from under the fender brackets in a manner that hides the fasteners from normal view. The fender steps have cutouts that receive the bolts. The trailer spring hangers are sandwiched between the trailer frame and the fender brackets in a manner that enables the spring hangers and the fender brackets to be adjustably positioned on the trailer frame independently of each other.

24 Claims, 3 Drawing Sheets

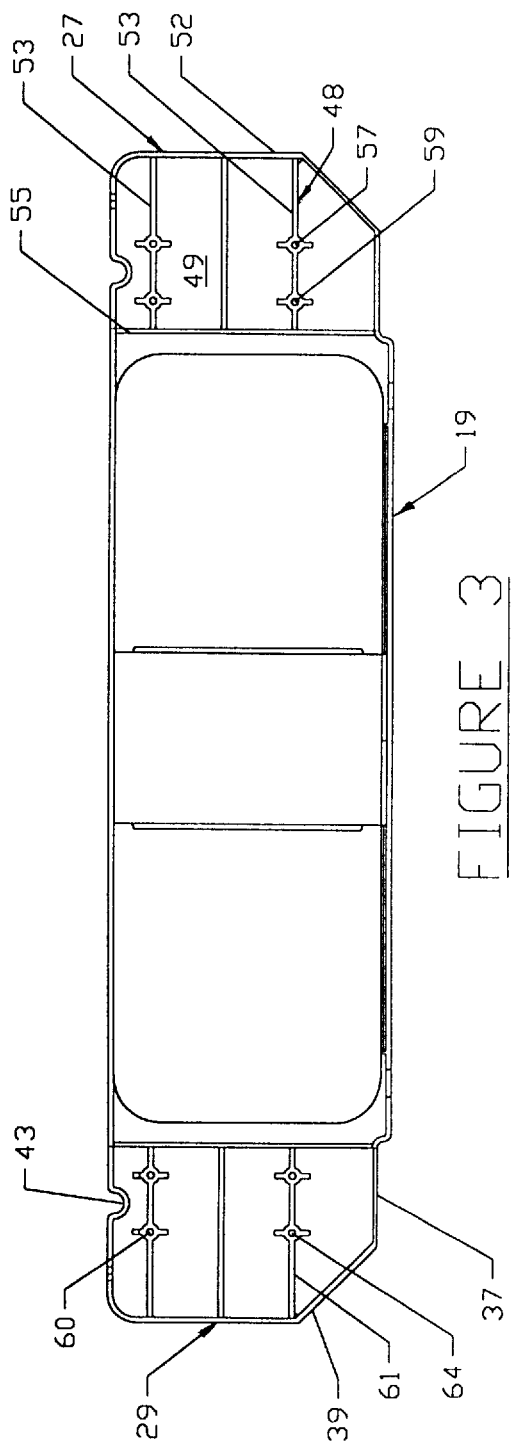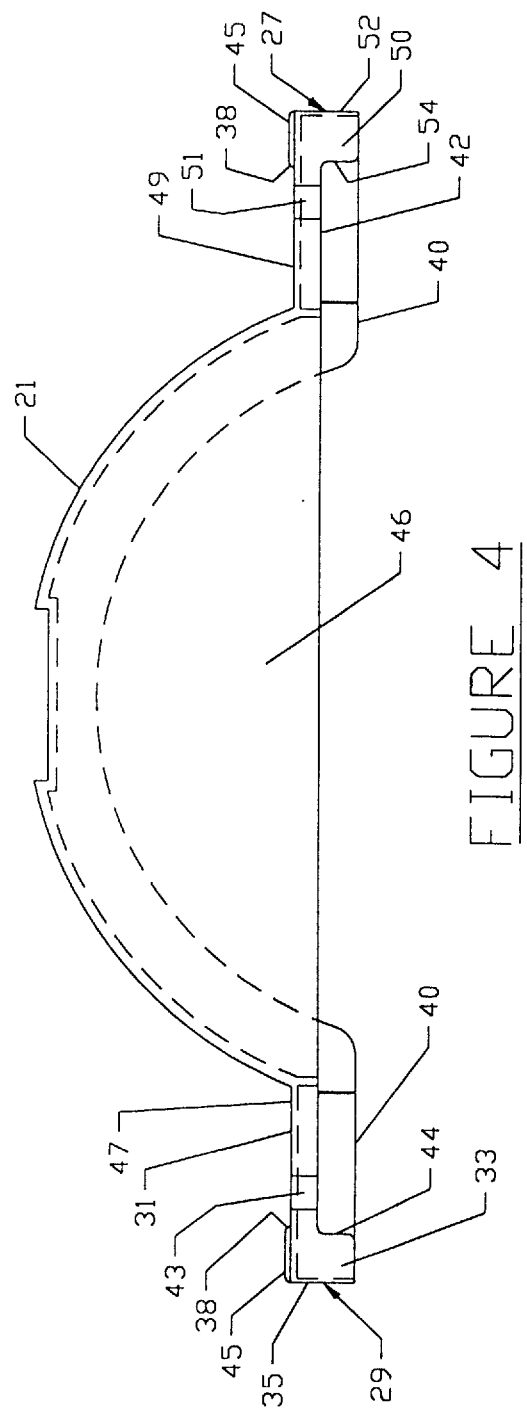

TRAILER FENDER WITH POSITIVELY RESTRAINED STEPS AND METHOD OF MOUNTING

BACKGROUND OF THE INVENTION

1. Field of the Invention.

This invention pertains to trailers, and more particularly to trailer fenders and the mounting thereof to trailer frames.

2. Description of the Prior Art.

Numerous types of trailers have been developed over the years to suit a wide variety of needs. For example, boat, snowmobile, utility, camping, and animal trailers are well known and in widespread use.

An important component of most trailers are the fenders that overlie the wheels. The fenders minimize water and debris from being thrown upwardly from the road against the boat or other item being hauled. The fenders further protect persons and objects from contact with the turning wheels.

Some prior trailer fenders were not sufficiently strong to safely support a person. For that reason, it was a common practice to build trailers with step brackets that were mounted to the trailer frame adjacent the front and back ends of the fenders. Other fenders were designed with front and back steps integral with the fender curved section. Examples of such fenders may be seen in U.S. Pat. Nos. Des. 308,953 and Des. 314,735. Fenders with integral steps are normally manufactured from a molded plastic material.

A common problem with prior molded fenders with integral steps is that of supporting the steps in a manner that does not detract from the appearance of the fender. For instance, the steps of the fender of the Des. 314,735 patent are supported by horizontal plates of associated support channels that are part of the trailer spring hangers. Vertical flanges on the fender at the junctions of the curved section thereof and the steps bolt to vertical legs of the support channels. That design provides adequate strength to support a person standing on the fender steps. However, there is nothing to prevent the steps from bending upwardly about the flanges such that the steps rise off the support channel horizontal plates. The rising of the steps detracts from the appearance of the fenders and trailer. In addition, the fact that the prior fender support channels are part of the spring hangers precludes the possibility that the fenders can be adjusted relative to the wheels, and thus limits the versatility of the trailer.

Another limitation of many prior fenders is the potential for a person standing on the curved section thereof to slip off. To reduce that risk, it is known to provide friction surfaces to the fenders. The friction surface may be added either directly to the curved section of the fender, or to a raised pad formed on the curved section. In some fenders, there is no curved section. Rather, the fender has three flat sections: a top horizontal section, and front and back sections extending at obtuse angles from the top section. Friction material may be added to the flat top section. Flat section fenders are usually considered to be rather unpleasing aesthetically.

Thus, despite the large variety of trailer fenders presently available, there nevertheless is room for improvement to them.

SUMMARY OF THE INVENTION

In accordance with the present invention, a fender and mounting therefor are provided that enhance the appearance and safety of a trailer. This is accomplished by apparatus that includes a recessed center pad in a fender arcuate section in conjunction with six-direction restraint of front and back fender steps on the trailer frame.

The fender front and back steps are integral with and extend from the corresponding ends of the fender arcuate section. Each step has a top wall with treads on the top surface thereof. The step top surface is partially surrounded by a ridge. There is a gap in the ridge adjacent the fender arcuate section. The bottom surface of each step top wall is reinforced with ribs. The bottom surfaces of the ribs are all coplanar. The ribs define several blind holes that open from the ribs' bottom surface.

The fender is mounted to the trailer frame by a pair of fender brackets, one under each step. A first end of each fender bracket is secured to the trailer frame. An end of a spring hanger is sandwiched between, but is not positively joined to, the fender bracket first end or the trailer frame. The second end of each fender bracket is attached to the bottom surface of the ribs of the corresponding fender step by fasteners passing through the fender bracket and engaging the blind holes. In that manner, the steps are restrained positively in all six directions to the fender brackets. The fasteners are not visible from the top of the fender, which makes the fender and the entire trailer very attractive.

Because of the sandwich construction for securing the fender brackets and spring hangers to the trailer frame, the fender location is adjustable relative to the wheels. The pad on the fender arcuate section is recessed an amount sufficient to impede a person's foot from slipping down the fender arcuate section.

In some trailer designs, it is desirable that the fenders be mounted to the trailer frame from the top walls of the steps rather than from the ribs bottom surfaces. In those situations, the fender brackets pass through the gaps in the ridges that partially surround the step top walls. Fasteners attach and positively restrain the steps to the fender brackets in all six directions.

The method and apparatus of the invention, using a recessed pad and six-direction restraint of the fender front and back steps, thus combine safety and aesthetics in a trailer. The fender is adjustable independently of the trailer wheels, even though the fender is mountable in different ways to the trailer frame.

Other advantages, benefits, and features of the present invention will become apparent to those skilled in the art upon reading the detailed description of the invention.

BRIEF DESCRIPTION OF THE DRAWINGS

FIG. 3 is a bottom view of the fender of the invention.

FIG. 4 is an inside view of the fender.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
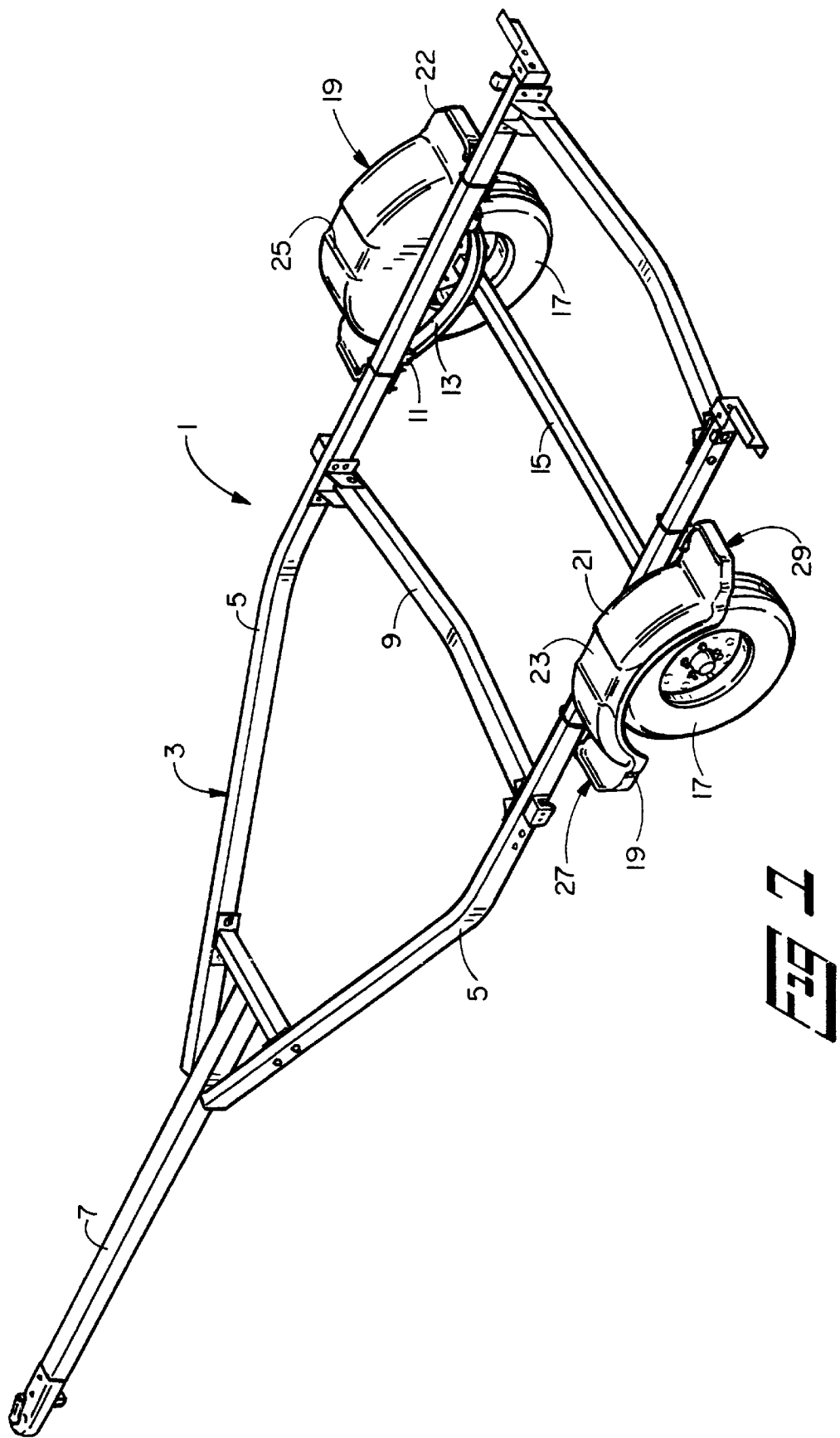
FIG. 1 is a perspective view of a typical trailer that includes the fender and mounting of the present invention.

Referring to FIG. 1, a trailer 1 is illustrated that includes the present invention. The specific trailer 1 shown, which is intended to transport personal watercraft, is merely representative of a wide variety of trailers with which the invention may be used. It will therefore be understood that the invention is not limited to use with any particular type of trailer.

The trailer 1 has a frame 3 comprised of two longitudinally extending side tubes 5 that converge to a tongue 7. Cross members 9 connect the side tubes 5 to each other. Rollers and/or bunks, not shown but well known in the art, carried by the cross members 9 support the hull of the watercraft to be transported. There is a spring hanger 11 on the underside of each side tube. Each spring hanger 11 connects to an associated leaf spring 13 that in turn holds an axle 15 for wheels 17.

In accordance with the present invention, fenders 19 each having an integral arcuate section 21 and steps 22 are mounted to the trailer frame 3 in a sturdy and aesthetically pleasing manner. The fender arcuate section 21 suits the diameter of the wheels 17 of the particular trailer 1. At the top of the arcuate section is a recessed and treaded pad 23. The pad 23 is recessed sufficiently to form a pair of vertical walls 25 between the arcuate section and the pad. The vertical walls 25 have a height that is adequate to impede a person's foot from slipping off the pad and onto the arcuate section. We have found that a height for the walls 25 of approximately 0.45 inches is satisfactory.

The steps 22 are connected to and integral with the front and back ends of the arcuate section 21 of the fender 19. The steps include a front step 27 and a back step 29. Looking also at FIGS. 2–4, the back step 29 has a flat horizontal top wall 31, which preferably has a treaded top surface to give non-slip characteristics. The back step further has an inside wall 33, an end wall 35, an outside wall 37, and an angled wall 39 between the end wall 35 and the outside wall 37. The walls 33, 35, 37, and 39 have a common lower edge 40. However, the inside wall is formed with a vertical edge 44 that terminates in a long bottom surface 42. The surface 42 is common with the bottom surface of an inside panel 46 that closes the inside of the arcuate section 21. There is a semi-circular cutout 43 in the top wall 31 at the inside wall 33. The cutout 43 extends from the top wall and along the inside wall to the bottom surface 42. A ridge 45 projects upwardly from the top wall. The ridge 45 extends along the full length of the end wall 35 and for a short distance along the inside wall. There is a gap 47 in the ridge between the end 38 of the ridge and the fender arcuate section. The ridge has sufficient height to impede a person's foot from slipping off the step top wall. We have found that a height of approximately 0.20 inches for the ridge works very well.

The front step 27 is constructed similarly to the back step 29. The front step includes a top wall 49 and an inside wall 50 with a cutout 51, and an end wall 52. The front step also has a ridge 45 with an end 38. The inside wall 50 has a vertical edge 54 that terminates at the bottom surface 42 of the inside panel 46.

As best shown in FIG. 3, the fender front step 27 is reinforced with ribs 48. In the illustrated construction, the ribs 48 include longitudinal ribs 53 that run along the bottom surface of the top wall 49 from the end wall 52 to an intermediate wall 55 that is approximately in line with the front end of the fender arcuate section 21. Short transverse ribs 57 intersect the longitudinal ribs 53 at several places. The ribs 53 and 57 have coplanar bottom surfaces that are also coplanar with the bottom surface 42. At the intersection of each longitudinal and transverse rib is a blind hole 59. The back step 29 is similarly constructed, having longitudinal ribs 61, transverse ribs 60, and blind holes 64.

Figure 2:
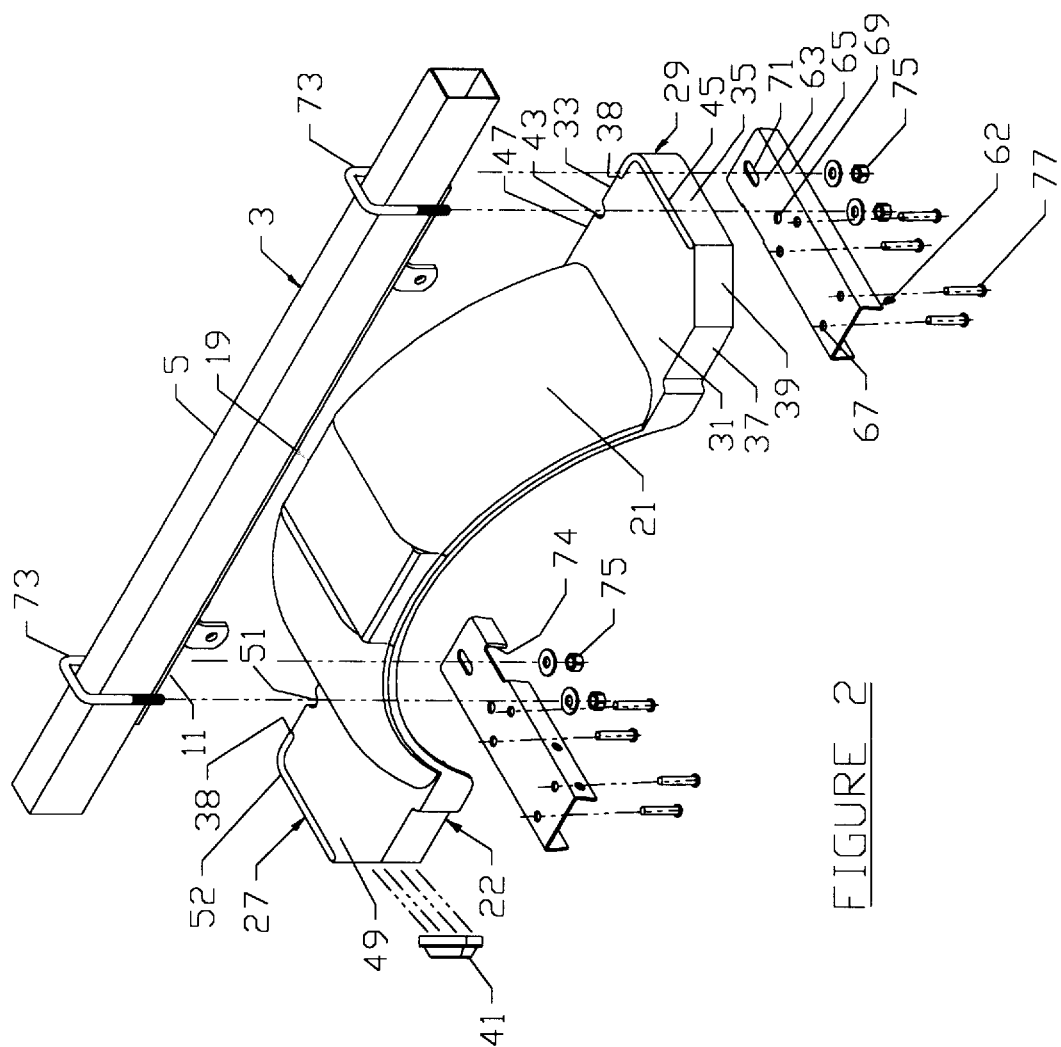
FIG. 2 is an exploded view showing the mounting of the fender of the invention to the trailer frame.

The fenders 19 are mounted to the trailer frame 3 by fender brackets 62. Each fender bracket 62 has a channel shape, with a horizontal center plate 63 and depending side legs 65. In the fender bracket center plate 63 are through holes 67 having the same pattern as the blind holes 59, 64 in the ribs 48 on the fender steps 27, 29, respectively. There also are two other holes 69, 71 in the fender bracket center plate. If desired, and as shown in FIG. 2, one of the holes 69 or 71 may be a slot. The spacing between the holes 69, 71 is set to receive a conventional U-bolt 73 that in turn is sized to fit over the trailer frame side tube 5.

To mount a fender 19 to the trailer frame 3, two U-bolts 73 are placed over the frame side tube 5. The spring hanger 11 is placed against the underside of the side tube at the proper location for the axle 15 and wheels 17. The holes 69 and 71 of the fender brackets 62 are slipped over the associated U-bolts. The spring hangers fit within notches 74 in the side legs 65 of the fender brackets. The fender brackets are properly spaced along the side tube and held in place with the U-bolts and nuts 75. In that manner, the spring hanger is sandwiched between the frame side tube and the fender brackets, and both the spring hanger and the fender brackets are held in place by the same U-bolts.

The steps 27, 29 of the fender 19 are placed on the corresponding fender brackets 62 such that the bottom surfaces of the ribs 53, 57, 60, 61 and the edge 42 rest on the fender bracket center plates 63. One leg of each U-bolt 73 enters the corresponding cutout 43 or 51 in the fender steps. Self-tapping screws 77 are placed in the fender bracket holes 67 and tapped into the blind holes 59, 64 in the fender ribs. In that manner, the steps are positively restrained to the fender brackets in six directions, and there is virtually no possibility that the steps will separate from the fender brackets. Because the screws 77 are hidden from normal view, the mounting of the fenders to the trailer frame is exceptionally neat and attractive. A light 41 is typically assembled to the angled wall of the front step, and the fender mounting is complete.

It is a feature of the present invention that the fenders 19 can be positioned on the trailer frame 3 independently of the spring hangers 11. Such independent positioning is achieved by the sandwich construction of the spring hangers between the side tubes 5 and the fender brackets 62, and by the lack of positive connections of the spring hangers with either the side tubes or the fender brackets. Loosening the nuts 75 on the U-bolts 73 enables the spring hangers and the fender brackets to be slid relative to each other along the side tubes for the short distances that are sometimes desired. By retightening the nuts 75, the new positions of the spring hangers and the fender brackets are maintained.

On some trailers, it may be desirable to mount the fenders 19 to fender brackets that lie on top of the steps 27, 29 rather than under the steps. In those cases, not illustrated in the drawings, the fender step top walls 31 and 49 are placed against the undersides of the fender brackets. The fender brackets pass through the gaps 47 in the ridges 45 of the steps. Fasteners, not shown, that are aligned with the fender blind holes 59 and 64 attach the fender steps to the fender brackets.

In summary, the results and advantages of trailers can now be more fully realized. The fender 19 and its mounting to a trailer frame provide both an attractive and sturdy protection over the trailer wheels. This desirable result comes from using the combined features of the fender steps 22 and the fender brackets 62. The fender brackets are secured directly to the trailer frame 3. The fender steps have ribs 48 that rest on and are attached to the center plates 63 of the fender brackets. Screws 77 between the fender brackets and the steps not only provide six-direction positive attachment of the steps to the fender brackets, but also are hidden from normal view, thereby adding to the aesthetic appeal of the invention. The recessed pad 23 on the top of the fender arcuate section 21 is sufficiently deep to greatly reduce the likelihood that a person's foot would slip off the pad. The sandwich construction for securing the spring hangers 11 and the fender brackets to the side tubes 5 enables the spring hangers and fender brackets to be positioned independently of each other along the side tubes.

It will also be recognized that in addition to the superior appearance of the fender 19 and the superior performance of the fender and the fender brackets 62, their construction is such as to cost little if any more than conventional trailer fenders and mountings. Also, since the fender and mounting components are of a simple and rugged design, they give long service life with minimal maintenance.

Thus, it is apparent that there has been provided, in accordance with the invention, a trailer fender and mounting that fully satisfy the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations of the invention as fall within the spirit and broad scope of the appended claims.

We claim:

1. A one-piece trailer fender comprising:
   a. an arcuate section having a predetermined diameter to suit a selected trailer wheel and being continuous between front and back ends, the arcuate section defining a recessed pad; and
   b. a front step integral with the front end of the arcuate section and a back step integral with the back end of the arcuate section, each step comprising a top wall having top and bottom surfaces.

2. A trailer fender comprising:
   a. an arcuate section having a predetermined diameter to suit a selected trailer wheel and front and back ends, the arcuate section defining a recessed pad; and
   b. a front step integral with the front end of the arcuate section and a back step integral with the back end of the arcuate section, each step comprising a top wall having top and bottom surfaces, wherein each step further comprises a plurality of ribs of one-piece with and located on the bottom surface of the top wall, the ribs having coplanar bottom surfaces and defining a plurality of blind holes.

3. The fender of claim 1 wherein the arcuate section comprises vertical walls adjacent the recessed pad of a height adequate to impede a person's foot from slipping off the pad and onto the fender arcuate section.

4. The fender of claim 2 wherein each step further comprises an inside wall, an outside wall, and an end wall each joined to the top wall, the inside wall being formed with an edge that terminates in a bottom surface that is coplanar with the bottom surfaces of the ribs.

5. The fender of claim 4 wherein each of the front and back steps defines a cutout in the respective top wall and along the associated inside wall.

6. The fender of claim 4 wherein each of the front and back steps further comprises a ridge upstanding from the respective top wall along the end wall and along a portion of the inside wall.

7. A trailer comprising:
   a. a frame having two parallel side tubes;
   b. wheel means for supporting the frame on the ground and comprising a spring hanger associated with each frame side tube;
   c. a front and a back fender bracket secured to each side tube, each fender bracket having a center plate, wherein each spring hanger is sandwiched between the associated side tube and the front and back fender brackets secured to the side tube;
   d. a fender having an arcuate section and front and back steps that are placed on the center plates of the respective fender brackets; and
   e. fastener means for attaching the fender steps to the center plate of the respective fender brackets.

8. The trailer of claim 7 wherein each fender bracket is secured to the side tube by a U-bolt passing through the fender bracket center plate and a pair of nuts threaded onto the U-bolt,
   so that tightening the nut secures the fender brackets to the side tube with the spring hanger sandwiched therebetween and loosening the nuts enables the spring hanger and the fender bracket to be positioned along the side tubes independently of each other.

9. The trailer of claim 7 wherein the fender arcuate section defines a recessed pad bounded by vertical walls of a height adequate to impede a person's foot from slipping off the pad and onto the arcuate section.

10. A trailer comprising:
    a. a frame having two parallel side tubes;
    b. wheel means for supporting the frame on the ground;
    C. a front and a back fender bracket secured to each side tube, each fender bracket having a center plate;
    d. a fender having an arcuate section and front and back steps that are placed on the center plates of the respective fender brackets; and
    e. fastener means for attaching the fender steps to the center plate of the respective fender brackets, wherein:
    each fender step is comprised of a plurality of ribs of one-piece with the fender step that are placed on the center plate of the associated fender bracket, the ribs defining a plurality of blind holes; and
    the fastener means pass through the fender bracket center plate and into the blind holes in the fender step ribs.

11. A trailer comprising:
    a. a frame having two parallel side tubes;
    b. wheel means for supporting the frame on the ground;
    c. a front and a back fender bracket secured to each side tube, each fender bracket having a center plate;
    d. a fender having an arcuate section and front and back steps that are placed on the center plates of the respective fender brackets, wherein:
    i. each step of the fender comprises a top wall having top and bottom surfaces;
    ii. the top wall of each step is reinforced with a plurality of ribs of one-piece with the step, the ribs having respective bottom surfaces that are coplanar, the ribs defining a plurality of blind holes; and
    iii. the bottom surfaces of the ribs are placed on the center plate of the associated fender bracket; and
    e. fastener means for attaching the fender steps to the center plate of the respective fender brackets, wherein the fastener means pass through the center plates of the fender brackets and into the blind holes in the fender step ribs to attach the fender steps to the fender brackets.

12. The trailer of claim 11 wherein:
a. each fender step has an inside wall joined to the top wall;
b. there is a cutout in the fender step top wall that extends along the inside wall; and
c. each fender bracket is secured to the associated frame side tube with a fastener that passes through the fender bracket center plate and through the cutout in the fender step top and inside walls when the fender step is attached to the fender bracket.

13. The trailer of claim 11 wherein each fender step has an inside wall with a surface that is coplanar with the bottom surfaces of the ribs,
so that the bottom surface of the step inside wall is placed on the center plate of the fender bracket when the step is attached to the fender bracket.

14. A trailer comprising:
a. a frame having two parallel side tubes;
b. wheel means for supporting the frame on the ground;
c. a front and a back fender bracket secured to each side tube, each fender bracket having a center plate;
d. a fender having an arcuate section and front and back steps that are placed on the center plates of the respective fender brackets, wherein:
  i. each fender step is comprised of a top wall, an end wall, and an inside wall; and
  ii. each fender step is further comprised of a ridge that upstands from the top wall along the end wall and along at least a portion of the inside wall, the ridge having sufficient height to impede a person's foot from slipping off the step top surface, and
e. fastener means for attaching the fender steps to the center plate of the respective fender brackets.

15. In combination with a trailer frame having two parallel side tubes and wheels that support the trailer frame for rolling along the ground, means for overlying each wheel comprising:
a. a one piece fender comprising an arcuate section overlying the wheel and a front step and a back step integral with the arcuate section, the fender arcuate section defining a recessed pad bounded by vertical walls having a height adequate to impede a person's foot from slipping off the pad and onto the arcuate section; and
b. bracket means secured to an associated side tube for attaching to the fender front and back steps to thereby mount the fender to the trailer frame.

16. In combination with a trailer frame having two parallel side tubes and wheels that support the trailer frame for rolling along the ground, means for overlying each wheel comprising:
a. a fender comprising an arcuate section overlying the wheel and a front step and a back step integral with the arcuate section, the fender arcuate section defining a recessed pad bounded by vertical walls having a height adequate to impede a person's foot from slipping off the pad and onto the arcuate section, wherein
the fender further comprises rib means for reinforcing each step; and
b. bracket means secured to an associated side tube for attaching to the fender front and back steps to thereby mount the fender to the trailer frame, wherein the bracket means is attached to the fender rib means.

17. The combination of claim 16 wherein the bracket means comprises:
a. a pair of fender brackets having respective center plates placed under the rib means of the fender front and back steps; and
b. bolt means for securing the fender brackets to the trailer frame side tube.

18. In combination with a trailer frame having two parallel side tubes and wheels that support the trailer frame for rolling along the ground, means for overlying each wheel comprising:
a. a fender comprising an arcuate section overlying the wheel and a front step and a back step integral with the arcuate section, the fender arcuate section defining a recessed pad bounded by vertical walls having a height adequate to impede a person's foot from slipping off the pad and onto the arcuate section, wherein
each fender step comprises a top wall and rib means for reinforcing the top wall; and
b. bracket means secured to an associated side tube for attaching to the fender front and back steps to thereby mount the fender to the trailer frame, wherein the rib means is placed on the bracket means when the fender steps are attached to the bracket means.

19. The combination of claim 18 wherein:
a. each fender step further comprises inside and end walls joined to the top wall;
b. the bracket means comprises a plurality of bolts placed over a trailer frame side tube; and
c. each fender step is formed with a cutout in the top wall and the inside wall that receives a bolt when the fender step is attached to the bracket means.

20. A method of mounting a fender to a trailer with wheels comprising the steps of:
a. providing a fender having an arcuate section with a recessed pad therein and front and back steps that are integral with the arcuate section;
b. securing front and back fender brackets to a frame of the trailer;
c. placing the fender steps on the corresponding fender brackets with the fender arcuate section over a trailer wheel; and
d. attaching and positively restraining the fender steps in six directions to the corresponding fender bracket.

21. The method of claim 20 wherein the step of providing a fender comprises the steps of:
a. forming each step with a top wall; and
b. reinforcing the top wall of each step with ribs.

22. The method of claim 21 wherein:
a. the step of placing the fender steps on the fender brackets comprises the step of placing the fender step ribs on the fender bracket; and
b. the step of attaching the fender steps to the fender brackets comprises the steps of passing fasteners through the fender bracket, and engaging the fasteners solely with the fender step ribs.

23. The method of claim 21 wherein:
a. the step of providing a fender comprises the further step of forming a cutout in the top wall of each fender step;
b. the step of securing fender brackets to a trailer frame comprises the step of securing the fender brackets to a trailer frame with at least one bolt associated with each fender bracket; and c. the step of placing the fender steps on the fender brackets comprises the step of receiving the associated bolts in the cutouts in the fender step top walls.

24. The method of claim 20 comprising the further step of adjusting the position of the fender brackets on the trailer frame independently of the position of the wheels on the trailer frame comprising the steps of:

a. sandwiching a wheel frame hanger between the trailer frame and the fender brackets;
b. sliding the fender brackets and the spring hanger relative to each other along the trailer frame; and
c. securing the fender brackets to the trailer frame.

* * * * *